United States Patent
Winkelmann

(10) Patent No.: US 12,240,590 B2
(45) Date of Patent: Mar. 4, 2025

(54) ACTUATOR ASSEMBLY FOR MOVING A MOVABLE WING TIP OF AN AIRCRAFT

(71) Applicant: Airbus Operations GmbH, Hamburg (DE)

(72) Inventor: Christoph Winkelmann, Buchholz (DE)

(73) Assignee: Airbus Operations GmbH, Hamburg (DE)

( * ) Notice: Subject to any disclaimer, the term of this patent is extended or adjusted under 35 U.S.C. 154(b) by 131 days.

(21) Appl. No.: 17/678,555

(22) Filed: Feb. 23, 2022

(65) Prior Publication Data
US 2022/0266984 A1 Aug. 25, 2022

(30) Foreign Application Priority Data
Feb. 25, 2021 (DE) .......................... 102021103421.3

(51) Int. Cl.
*B64C 13/34* (2006.01)
*F16D 11/10* (2006.01)
*F16D 11/00* (2006.01)

(52) U.S. Cl.
CPC .............. *B64C 13/34* (2013.01); *F16D 11/10* (2013.01); *F16D 2011/008* (2013.01)

(58) Field of Classification Search
CPC ........ B64C 13/00; B64C 13/34; B64C 23/072
See application file for complete search history.

(56) References Cited

U.S. PATENT DOCUMENTS

| 1,872,170 A | 8/1932 | Palmer | |
|---|---|---|---|
| 2003/0080246 A1* | 5/2003 | Koizumi | B64C 13/34 244/99.3 |
| 2014/0042269 A1 | 2/2014 | Zantz et al. | |
| 2019/0002083 A1 | 1/2019 | Wilson et al. | |
| 2021/0039770 A1* | 2/2021 | Thomas | B64C 9/00 |

FOREIGN PATENT DOCUMENTS

| DE | 28 26 718 | 12/1979 |
|---|---|---|
| DE | 34 21 761 | 1/1985 |
| DE | 10 2014 007 266 | 11/2015 |

(Continued)

OTHER PUBLICATIONS

Search Report for Application EP 22155218.5, nine pages, dated Jul. 19, 2022.

(Continued)

*Primary Examiner* — Philip J Bonzell
*Assistant Examiner* — Anna L. Gordon
(74) *Attorney, Agent, or Firm* — Nixon & Vanderhye P.C.

(57) ABSTRACT

An actuator assembly for moving a movable aerodynamic surface of an aircraft is disclosed including an input section for introducing an externally provided rotary motion into the actuator assembly, and a geared rotary actuator having at least one actuator slice having a planetary gear with a sun gear couplable to the input section, a fixed gear attachable to a fixed component of the aircraft and an output gear couplable with the movable aerodynamic surface. At least one clutch is connected to the geared rotary actuator and is configured to couple the movable surface with the input section and to selectively decouple the movable surface from the input section, such that it is freely movable.

15 Claims, 5 Drawing Sheets

(56) References Cited

FOREIGN PATENT DOCUMENTS

| DE | 10 2015 201 935 | 8/2016 | | |
|----|-----------------|--------|---|---|
| DE | 10 2017 102 186 | 8/2018 | | |
| EP | 0 146 281 | 6/1985 | | |
| EP | 2902314 A1 * | 8/2015 | ............ | B64C 13/50 |
| EP | 2947003 A1 * | 11/2015 | ............ | B64C 3/56 |
| EP | 3 400 167 | 11/2018 | | |
| EP | 3620372 A1 * | 3/2020 | ............ | B64C 13/28 |
| EP | 3 677 504 | 7/2020 | | |
| EP | 3677503 A2 | 7/2020 | | |
| WO | 8600968 A1 | 2/1986 | | |
| WO | 2016/015841 | 2/2016 | | |
| WO | 2017/118832 | 7/2017 | | |

OTHER PUBLICATIONS

Office Action for Application EP 22155218.5, five pages, dated Feb. 21, 2024.
Search Report for Application No. DE 102021103421.3, dated Sep. 15, 2021 (8 pages).

* cited by examiner

ACTUATOR ASSEMBLY FOR MOVING A MOVABLE WING TIP OF AN AIRCRAFT

CROSS REFERENCE TO RELATED APPLICATION

This application claims priority to and incorporates by reference the entirety of German Application Number DE 10 2021 103421.3, filed Feb. 25, 2021.

TECHNICAL FIELD

The invention relates to an actuator assembly for moving a movable aerodynamic surface of an aircraft, a wing structure having a movable wing tip portion and an aircraft having such a wing structure.

BACKGROUND OF THE INVENTION

Movable wing tips and foldable wing tip mechanisms on wing structures for aircraft are commonly known. Existing actuation systems for wing tips are typically used on the ground to fold wing tips for a more efficient storage of the aircraft, e.g. on an aircraft carrier. A few aircraft, e.g. North American-Rockwell B70 Valkyrie, have been equipped with foldable wing tips that could also be moved during flight to optimize the load distribution and drag of the wing.

Also, wing structures are known, in which wing tips are movable for load alleviation. For example, EP 3 400 167 A1 shows an aircraft comprising a wing having a fixed wing with a wing tip device moveably mounted about a hinge at the tip thereof. The wing tip device is operable between a flight configuration, and a load alleviating configuration for load alleviation during flight. The aircraft comprises a restraining assembly operable between a restraining mode in which the wing tip device is held in the flight configuration using a restraining force such as by a brake, and a releasing mode in which the restraining force on the wing tip device is released, such that the wing tip device may adopt the load alleviating configuration.

SUMMARY OF THE INVENTION

The disclosure provides an alternative solution for a movable wing tip operable for load alleviation with an improved reaction time and a minimum installation space.

The disclosure contemplates having an actuator assembly according to claim 1. Advantageous embodiments and further improvement are given in the subclaims and the following description.

An actuator assembly for moving a movable aerodynamic surface of an aircraft is proposed, comprising an input section for introducing an externally provided rotary motion into the actuator assembly, and a geared rotary actuator having at least one actuator slice comprising a planetary gear with a sun gear couplable to the input section, a fixed gear attachable to a fixed component of the aircraft and an output gear couplable with the movable aerodynamic surface. According to the invention, at least one clutch is connected to the geared rotary actuator and is designed to couple the movable surface with the input section and to selectively decouple the movable surface from the input section, such that it is freely movable.

The actuator assembly thus comprises a geared rotary actuator for moving the movable aerodynamic surface couplable with a respective output gear through introducing a rotary motion at the input section. For providing the desired motion it comprises at least one actuator slice, which comprises a planetary gear in a cage or housing. The geared rotary actuator may comprise a plurality of actuator slices attached to one another in a row and to operate all of them simultaneously, such that all output gears are driven simultaneously.

Each planetary gear, or epicyclic gear, comprises a sun gear, which is arranged on a central axis of the geared rotary actuator. It is surrounded by several planet gears, which mesh with the sun gear and are coupled with an outer ring gear. It may be possible to use another setup with additional elements. In the setup of the geared rotary actuator, the one component of the planetary gear is intended to be fixed to a structurally fixed component. This component will be referred to as fixed gear in the following. Another component of the planetary gear will be driven to rotate according to the gear ratio. This component will be referred to as output gear in the following and will be coupled with the movable aerodynamic surface. Depending on the detailed design, the fixed gear and at the output gear may vary through different embodiments. However, it may be advantageous but not limiting to use the ring gear as the output gear and to use a support cage of the planet gears as the fixed gear.

The input section may simply comprise an input shaft, which is couplable to a drive unit, such as an electric or a hydraulic motor. However, the input section may also comprise a separate input gear stage having a first gear ratio, wherein a shaft or another torque transferring element extends from the input gear stage to the respective actuator slice. In case several actuator slices are used, they are all driven by the input section.

Each output gear may comprise a lug that protrudes in a radial direction to mechanically couple the respective movable surface with the output gear.

The purpose of this actuator assembly is to selectively allow a free movement of the movable aerodynamic surface in conditions that would lead to excessive structural loads on the structure, to which the movable component is attached. For example, the movable aerodynamic surface may be a wing tip, which is movably attached to a fixed wing structure through a hinge. In the majority of all flight conditions the wing tip is rigidly attached to the wing structure and cannot move. Hence, loads that act on the wing tip may be transferred into the fixed wing structure. However, the actuator assembly is a key enabler for the semi aeroelastic hinge technology. It is designed such that the wing tip or another movable component can selectively be disengaged during flight under full bending load to allow a free flapping mode of the respective component. According to the invention, drag torques and associated bending moments on the hinge line of the free moving wing tip or other component are excluded or minimized through the various embodiments. By including a clutch directly into the geared rotary actuator assembly it allows a very fast reaction time to release the component, while at the same time, it occupies a minimized space envelope.

In an advantageous embodiment, that the input section comprises an input shaft, which comprises or is coupled with the sun gear. The input shaft is provided for coupling a drive unit with the at least one actuator slice. It may comprise a bevel gearbox that provides a transition of the input shaft direction. This allows to place a drive unit in a direction lateral to the central axis of the geared rotary actuator to reduce the installation space along the central axis. For minimizing the weight the shaft may be hollow. As the sun gear is the central element of each actuator slice it is couplable with the input shaft. If desired, a first gear ratio may be provided through an input gear section as explained above.

In an advantageous embodiment the input shaft completely extends through the at least one actuator slice, wherein a first end of the input shaft is couplable with a drive unit and wherein a second end of the input shaft is couplable with a brake. Providing a brake at the second end is a safety function. The brake may be selectively engageable to arrest the input shaft. Also, additional elements may be coupled with the second end, such as a position sensor couplable with a control unit to provide information about the rotational position of the respective actuator slice and/or the input shaft.

According to an advantageous embodiment the at least one clutch is arranged upstream of the at least one actuator slice. The term "upstream" relates to an installation position of the at least one clutch between the at least one actuator slice and the input section. Thus, a connection between the input section and the at least one actuator slice may selectively be canceled or restored. A drag torque acting onto the output gear is only generated by the respective actuator slice and does not include any drag torque from the input section.

Advantageously, two clutches may be provided, wherein a first clutch is arranged upstream of the at least one actuator slice in the region of the first end, and wherein a second clutch is arranged downstream, of the at least one actuator slice in the region of the second end, such that the movable surface is decouplable from a brake that is couplable with the second end. Thus, the two clutches isolate the at least one actuator slice from the input section and a part of the input shaft that comprises the second end, where other drag torque inducing elements are provided.

In a further advantageous embodiment, the at least one clutch is arranged in or at the at least one actuator slice, such that the respective output gear is decouplable from the remaining part of the respective planetary gear. This approach differs from the arrangement upstream of the at least one actuator slice. Here, the at least one clutch is installed in a way that the output gear and the movable component couplable therewith, from the remaining part of the actuator slice. This further decreases the drag torque to a minimum. However, the respective clutch would be exposed to a higher load level, which would require a sturdier design.

Further advantageously, a clutch is arranged at each output gear of each of the at least one actuator slice to selectively decouple the respective output gear from the movable surface. Thus, in case a plurality of actuator slices is used, each one of them comprises a clutch to selectively decouple the output gear from the remaining part of the planetary gear. the load of the movable component is distributed to the individual actuator slices, such that the load is also distributed to the plurality of clutches.

In a further advantageous embodiment, at least a part of the output gear of each of the at least one actuator slice is movable along a central axis of the geared rotary actuator in a first direction to decouple the respective output gear from the remaining part of the respective planetary gear, and in a second direction to couple the respective output gear to the remaining part of the respective planetary gear. The at least one clutch is actuated by a mechanism, which moves the whole movable component along the central axis. For example, if the component is a wing tip, it may be pushed forward in the direction of the leading edge to be disengaged. Clutch elements may be installed between the output gear of the respective actuator slice and attachments to the movable component. The output gear may be changed such that a rotational movement of the component is achieved by a simple sleeve bearing which also allows the component to move forward by a short distance, e.g. by approximately 30 mm in case of a wing tip.

In this embodiment, a spring unit may be provided, which is designed to urge the respective output gear to the second direction. Thus, a clutch actuator may be provided at one end of the geared rotary actuator, wherein a counter force is provided at the other end through the spring unit. This reduces the required installation space, weight and number of active elements.

In another advantageous embodiment, the at least one clutch comprises a first element and a second element, wherein the first element comprises a first toothing, wherein the second element comprise a second toothing, and wherein the first toothing and the second toothing are designed to engage each other upon flush contact of the elements to transfer a torque. The toothings are designed to mesh with each other to allow a torque transfer. To avoid the creation of axial forces the toothings may comprise a rectangular cross-sectional surface.

In an alternative embodiment the at least one clutch is a friction clutch, which comprises at least two friction disks that are designed to be brought into a surface contact to engage the clutch.

At least one clutch actuator may be provided to selectively open or close the at least one clutch. The clutch actuator may be a hydraulic actuator or an electric actuator, which directly or indirectly acts upon the at least one clutch. In an exemplary embodiment, the clutch actuator is a linear actuator that is provided to push or pull a component to engage or disengage the at least one clutch. It may be advantageous to provide a lever arrangement between the respective component and the at least one clutch actuator to reduce the required actuator force. A similar arrangement may be installed in a jack head of a ball screw actuator.

The at least one clutch may comprise a bearing having rolling elements to reduce a required clutch actuation force. For example, roller bearings or other rolling elements at all movable contact surfaces may be provided.

In a further advantageous embodiment one of the first toothing and the second toothing comprises rollers rotatably supported in one of the first clutch disc and the second clutch disc, wherein the other one of the first toothing and the second toothing is designed to receive the rollers. The friction between the toothings can thus be minimized, which leads to a clear reduction in the required clutch force, as well as the reaction time.

Also, the actuator assembly may comprise at least one lug, wherein a first lug is couplable with the fixed component and wherein a second lug is couplable with the movable surface, wherein the at least one clutch is designed to selectively decouple the output gear from the second lug. Thus, the output gear may remain coupled with the remaining parts of the planetary gear and the at least one clutch may act to decouple a second lug from the output gear. The second lug may exemplarily be attached to an element that surrounds the output gear.

The invention further relates to a wing structure comprising a fixed wing portion, a hinge, a movable wing tip portion coupled to the fixed wing portion through the hinge, and at least one actuator assembly, wherein the at least one actuator assembly is coupled with the fixed wing portion and the wing tip portion to selectively move the wing tip portion about the hinge. According to the invention, the actuator assembly comprises a clutch to selectively decouple the wing tip portion from the actuator assembly, such that it freely rotates about the hinge. The wing structure thus comprises a wing tip portion that is movable about a hinge. It provides the ability to reduce the footprint of the wing on ground by swiveling the wing tip portion from a use state into a stowed state. In the use state the wing tip portion extends in a spanwise direction. The hinge axis may be arranged parallel to a symmetry axis of the wing, which is parallel to a longitudinal axis of an aircraft to which the wing structure is attached. The wing tip portion may be swiveled about the hinge axis to reduce the spanwise extension of the wing structure. The wing tip portion may then may extend into an upward direction and may be folded onto the fixed wing portion.

In an advantageous embodiment, the at least one actuator assembly comprises an actuator assembly of the preceding description.

Still further, the invention relates to an aircraft comprising at least one wing structure as explained above and/or a movable aerodynamic surface and an actuator assembly according to the above description. The movable component may be an exterior component for an aircraft, which can be swiveled around at least one swiveling axis to be brough into a use position and into a stowed state. For example, the movable component may be a flow body that is swivably supported on a fuselage or a wing of the aircraft. The use state corresponds to an operating state of the movable component during a smooth cruise flight. Besides flaps and doors, also wing tips can be considered.

BRIEF DESCRIPTION OF THE DRAWINGS

Other characteristics, advantages and potential applications of the present invention result from the following description of the exemplary embodiments illustrated in the Figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the Figures.

DETAILED DESCRIPTION OF EXEMPLARY EMBODIMENTS

Figure 1:
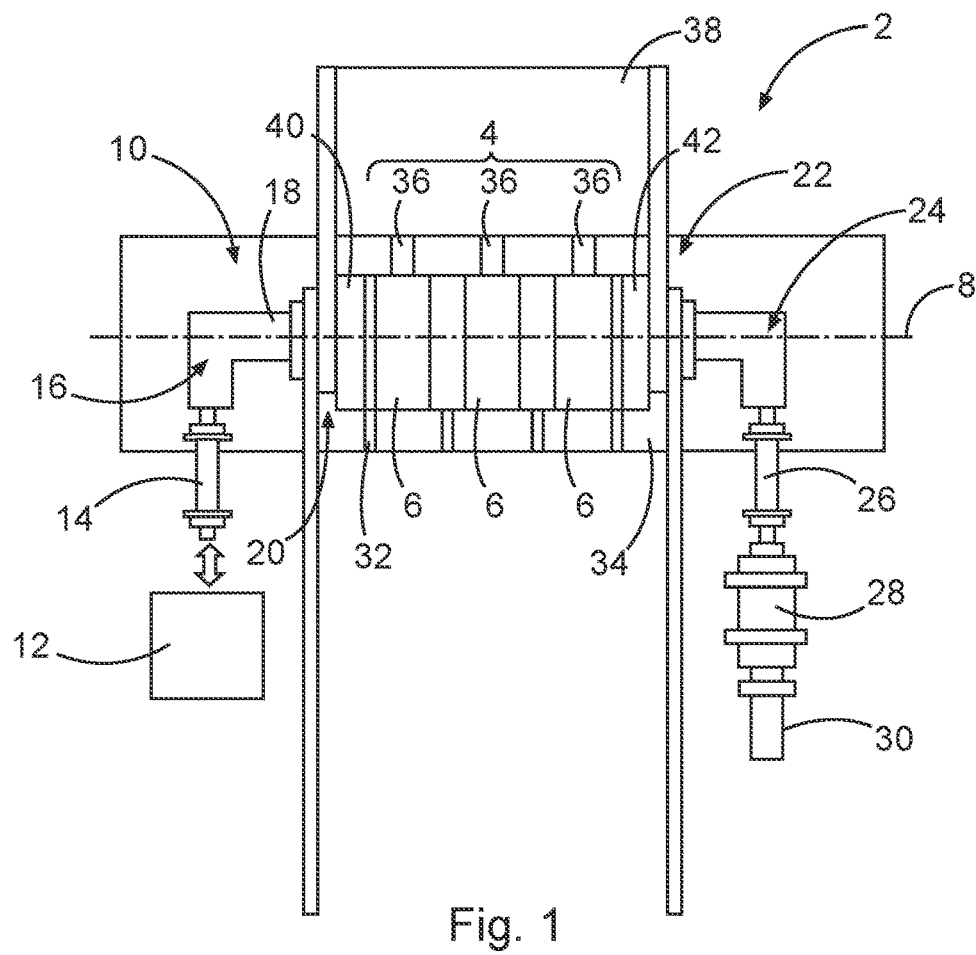
FIG. 1 to FIG. 3 show various illustrations of a first exemplary embodiment.

FIG. 1 shows an actuator assembly 2 in a schematic view. Here, the actuator assembly 2 comprises a geared rotary actuator 4 having a plurality of actuator slices 6, which comprise a planetary gear. All actuator slices 6 are attached to one another along a central axis 8. An input section 10 is provided for introducing an externally provided rotary motion into the actuator assembly 2. As an example, then input section 10 is coupled to a drive unit 12, which may comprise a redundant arrangement of two motors, a differential gear, and an output shaft. The drive unit 12 is connected to a first shaft 14, which is connected to a first bevel gear 16. In doing so, the drive unit 12 may be placed in a region lateral to the central axis 8. The input section 10 comprises an input shaft 18 that extends along the central axis 8 from a first end 20 to a second end 22. At the second end 22 a second bevel gear 24 is provided, which is connected to a second shaft 26. Here, the brake 28 as well as a system position sensor 30 are arranged.

The actuator slices 6 are coupled with first lugs 32 couplable with a fixed component 34, such as a wing box, which may comprise stiffening elements such as stringers, spars and skin portions. In this example, the actuator assembly 2 is arranged in a wing structure of an aircraft, which is described further below. Also, output gears (not shown) of the actuator slices 6 are coupled with second lugs 36, which are coupled with a movable surface 38. The surface 38 may be a wing tip portion, which is swivably arranged on the central axis 8, which is thus also a swivel axis. By driving the geared rotary actuator 4, the second lugs 36 swivel the surface 38 about the central axis 8.

For reducing structural loads in certain conditions it is desirable to decouple the surface 38 from the fixed component 34. For achieving this, it is decouplable from the input section 10, such that it is freely swivable. In the exemplary embodiment shown in FIG. 1 a first clutch 40 and a second clutch 42 are provided. The first clutch 40 is arranged in the region of the first end 20. The second clutch 42 is arranged in the region of the second end 22. Both clutches 40 and 42 are adapted to selectively disengage the input shaft 18 from the actuator slices 6. In this exemplary embodiment, the clutches 40 and 42 are arranged upstream of the geared rotary actuator 4, i.e. between the input shaft 18 and the geared rotary actuator 4.

The arrangement of elements shown in FIG. 1, i.e. gears, gearboxes, brake, drive unit and shaft elements depends on the installation constraints and is not limiting the subject-matter of the invention. It may also be possible to use an arrangement without shafts and gearboxes, e.g. having drive units directly mounted on the geared rotary actuator.

Figure 2:
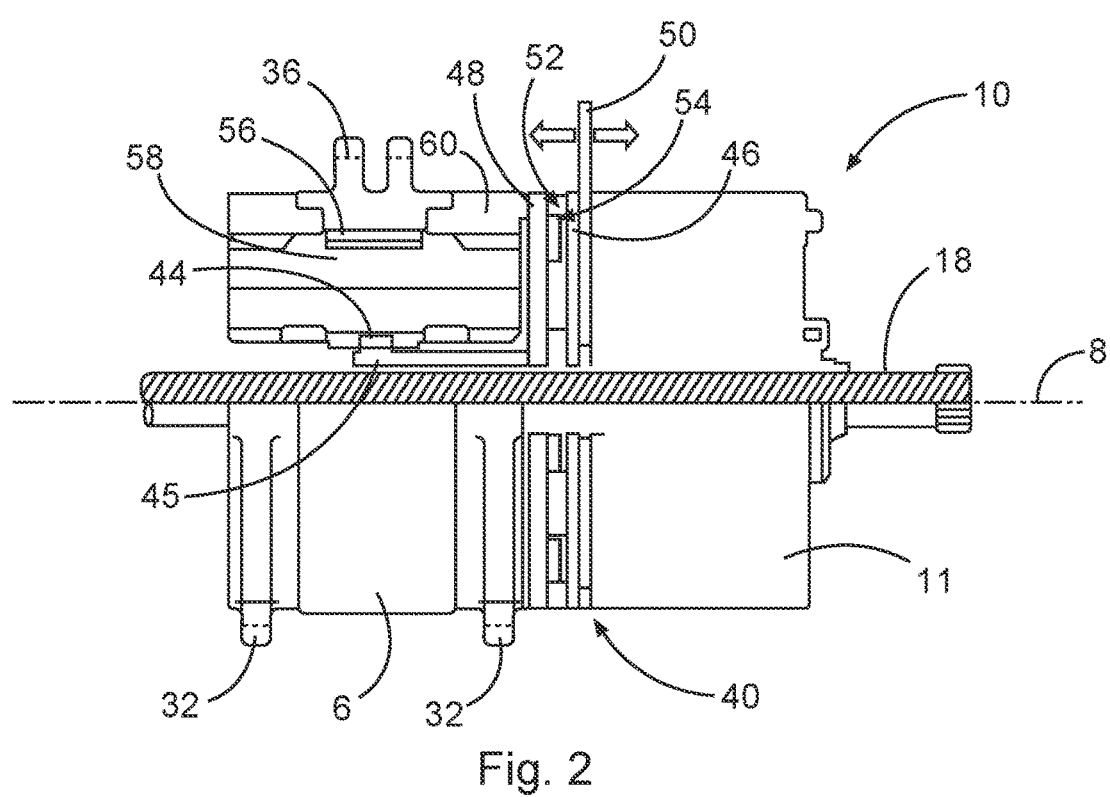

FIG. 2 shows a detail of on actuator slice 6, the input section 10 and the first clutch 40. The input section 10 exemplarily comprises an input gear stage 11, which is coupled to the input shaft 18. The detailed setup of this input gear stage 11 is not crucial for the invention and it may be selected by a skilled person appropriately.

For transferring torque from the input shaft 18 to the first actuator slice 6, the first clutch 40 comprises a first element in the form of a first clutch disc 46 and a second element in the form of a second clutch disc 48. The second clutch disc 48 is coupled with a sun gear 44 through a hollow shaft 45. A lever 50 is movable by a clutch actuator (not shown herein), which is designed to let the clutch discs 46 and 48 contact or to separate them from each other. The first clutch disc 46 comprises a first toothing 52, while the second clutch disc 48 comprises a second toothing 54. The toothings 52 and 54 are designed to complement each other, such that they mesh with in a torque-transferring manner when the clutch discs 46 and 48 contact each other. Hence, the first clutch 40 can selectively couple the actuator slice 6 with the input shaft 18 or decouple it therefrom.

For the sake of completeness, the actuator slice 6 comprises a ring gear 56, which meshes with planet gears 58. The planet gears 58 may be supported by a cage 60, which is coupled to the fixed component 34 through the first lug 32. The ring gear 56 constitutes the output gear and comprises the second lug 36 for driving the movable component 38.

Figure 3:
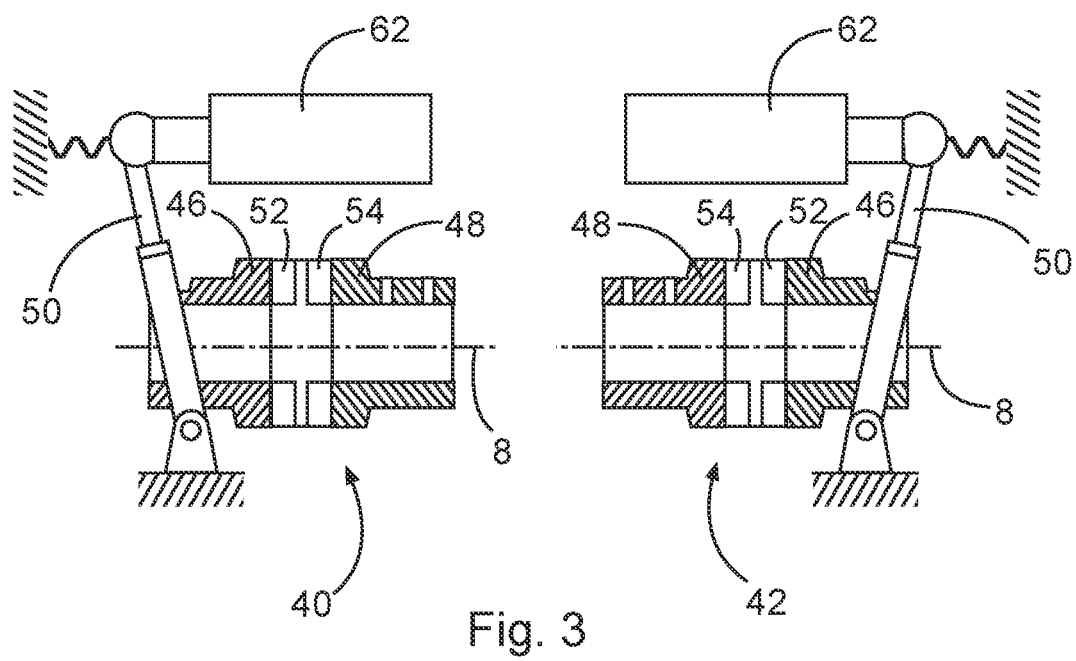

FIG. 3 shows simplified illustrations of the first clutch 40 and the second clutch 42. Here, the first clutch 40 and the second clutch 42 comprise a first clutch disc 46 and a second clutch disc 48. Both clutches 40 and 42 are shown in the disengaged state, where the toothings 52 and 54 are separated from each other. In each of the clutches 40 and 42, a clutch actuator 62 is connected to the clutch lever 50, which exemplarily moved the first clutch disc 46 along the central axis 8. The clutch actuator 62 may be provided in the form of a hydraulic actuators, or an electrical or electromechanical actuators, e.g. in the form of a ball spindle drive with a low gear ratio.

Figure 4:
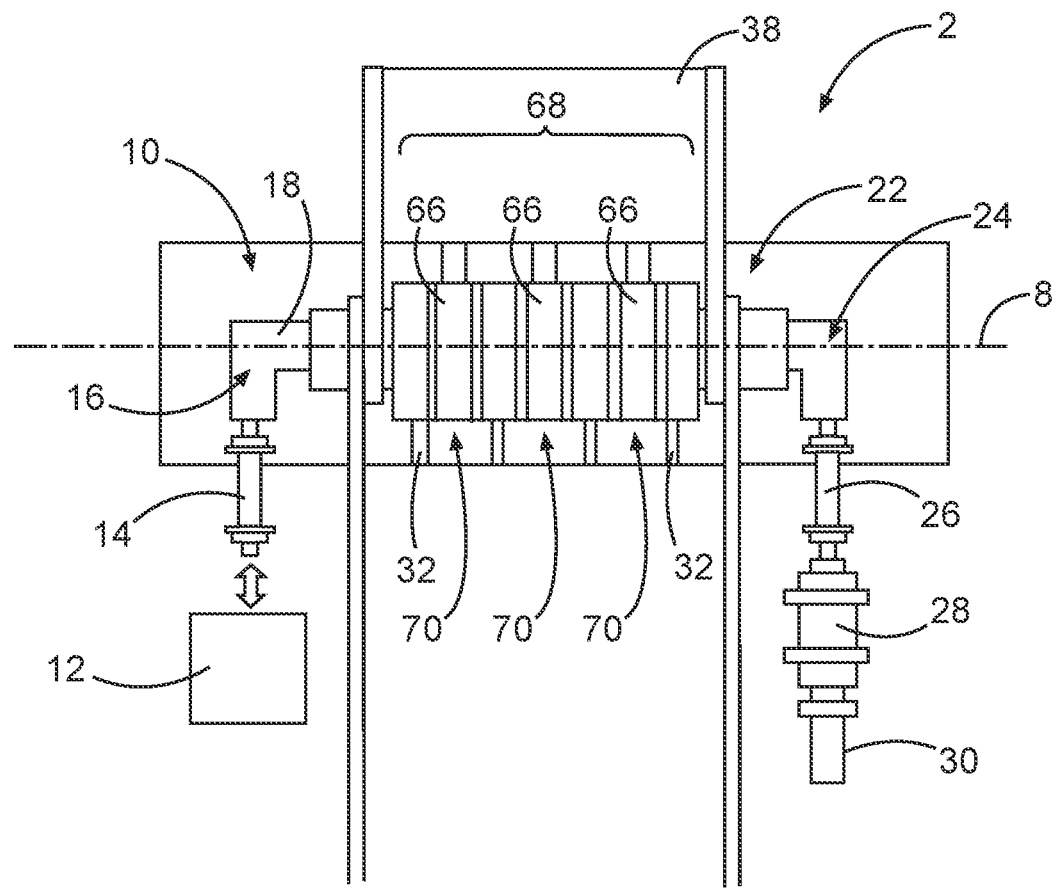
FIG. 4 and FIG. 5 show a second exemplary embodiment.

FIG. 4 shows another actuator assembly 64, which differs from the assembly 2 of FIG. 1. Here, clutches 66 are provided, which may be designed similarly to the first clutch 40 and the second clutch 42. However, in this exemplary embodiment the clutches 66 are fully integrated into a geared rotary actuator 68, i.e. directly in actuator slices 70 to selectively decouple the respective output gears 56 from the surface 38. This is further explained in conjunction with FIG. 5.

Here, the output gear 56 is arranged inside an output member 57, which is coupled with two first clutch discs 46 at both axial sides. Two second clutch discs 48 can be brought into engagement or disengagement with the first clutch discs 46 for selectively coupling the output gear 56 with the output member 57. For this, the second clutch discs 48 are movable through clutch actuators 62, which are provided as hydraulic actuators and are selectively supplied with hydraulics fluid through a solenoid valve 72. For providing a reversing force, springs 73 are provided. The valve 72 may comprise a very low reaction time in the region of 10 to 20 ms. Thus, upon request, both second clutch discs 48 can rapidly be disengaged from the first clutch discs 46 to disengage the associated output gear 56. All actuators 62 may be attached to the output member 57 and coupled with a flexible hose 74 for receiving hydraulics fluid. Thus, if the output member 57 moves about the central axis 8, the flexible hose 74 compensates a positional offset.

Figure 5:
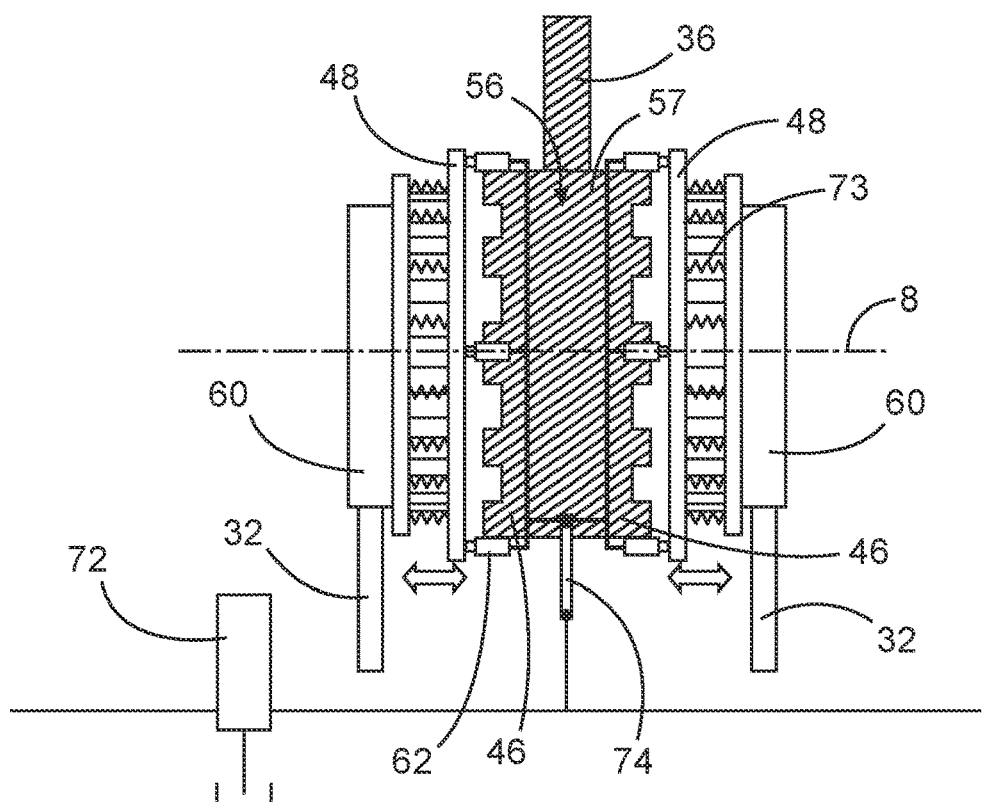
Figure 6:
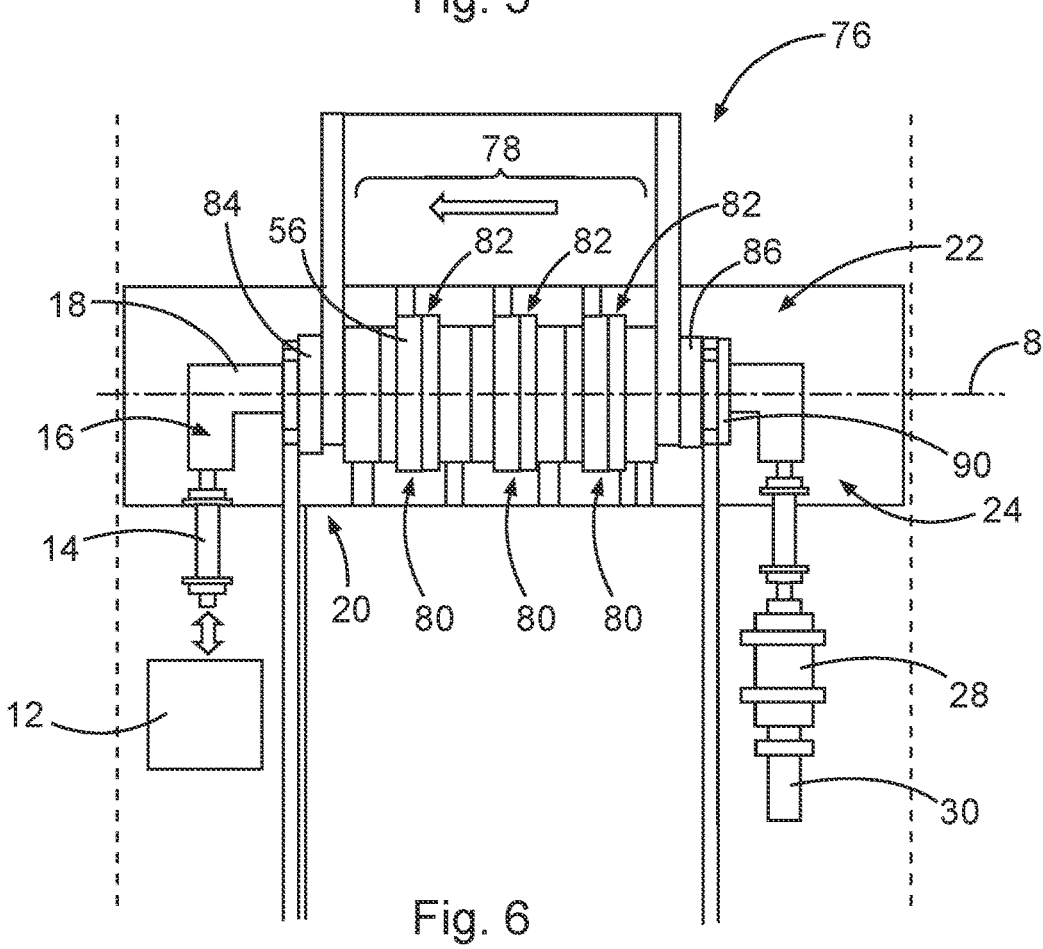
FIG. 6 and FIG. 7 show a third exemplary embodiment.

FIG. 6 shows a still further exemplary embodiment in the form of an actuator assembly 76. Here, a geared rotary actuator 78 has several actuator slices 80 with integrated clutches 82. Here, each output gear 56 comprises a first clutch disc 46, which is engageable or disengageable from a second clutch disc 48. However, different than in FIG. 5, only one axial side of the output gear 56 comprises such an arrangement. This is further explained in conjunction with FIG. 7.

Figure 7:
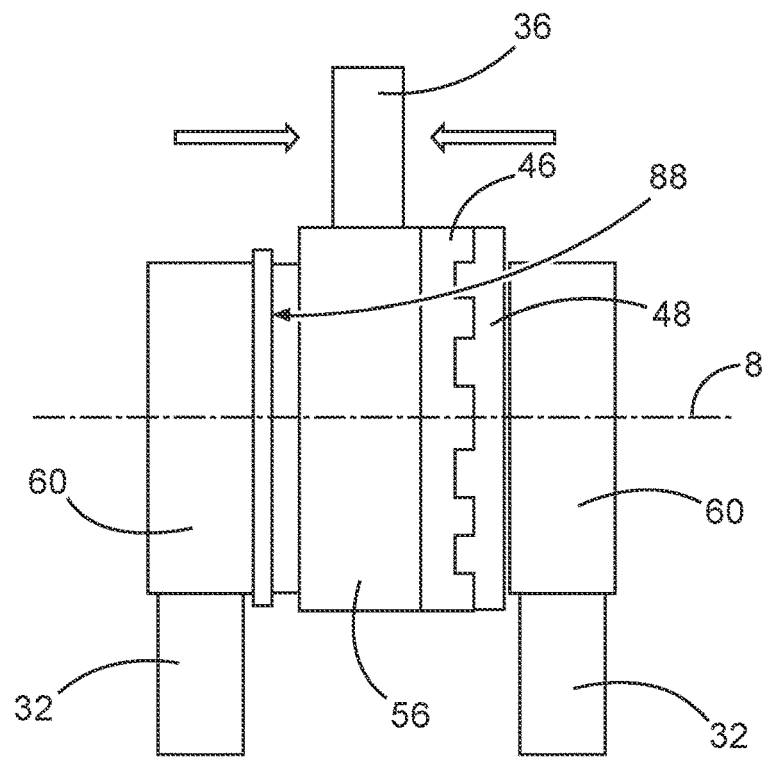

It becomes apparent that by moving all output gears 56 along the central axis 8 towards the first end 20, the first clutch discs 46 are disengaged from the second clutch discs 48. To reverse this motion, a spring unit 84 is provided in the region of the first end 20, which is compressed during said motion and which expands if an actuation force is removed. A clutch actuator 86 is arranged in the region of the second end 22. As shown in FIG. 7, sleeve bearings 88 are provided on the side of the output gear 56 facing away from the associated first clutch disc 46.

A component position sensor 90 is directly coupled with the component 38 in addition to the system position sensor 30. Thus, a control unit may gather the exact position of the movable component 38 after it has been decoupled from the input shaft 18.

Figure 8:
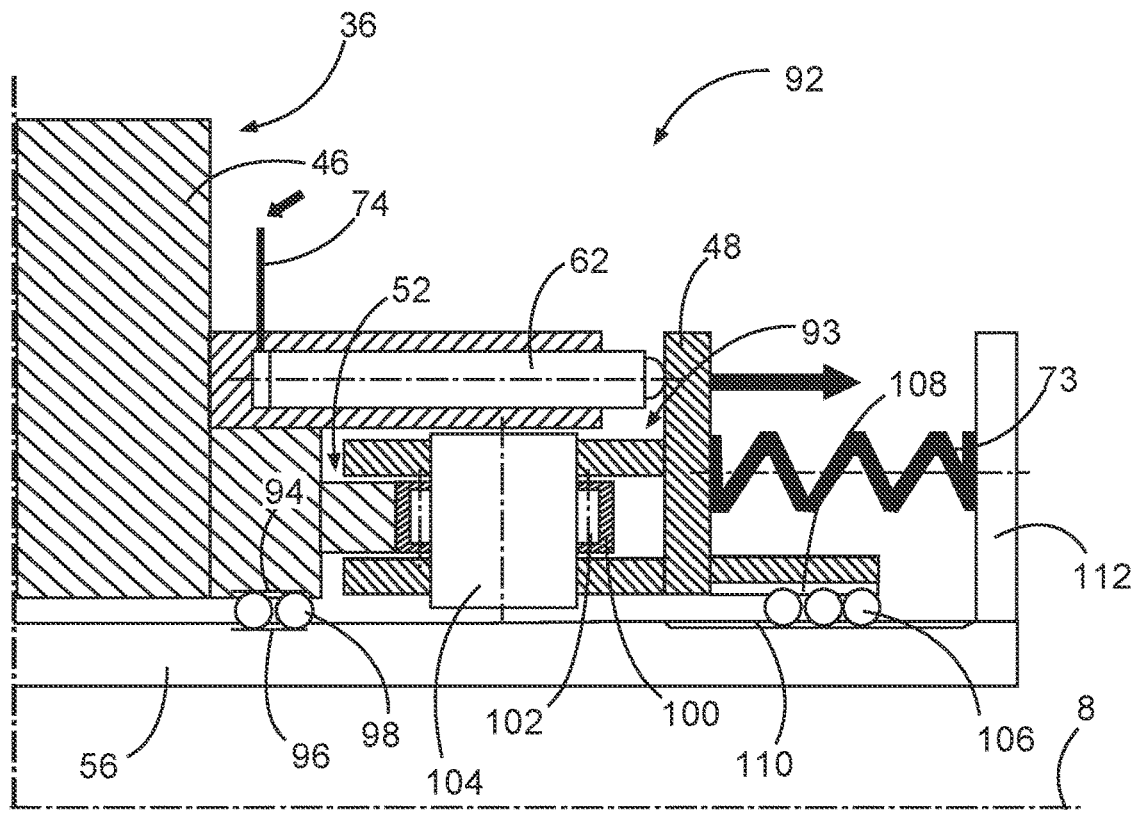
FIG. 8 shows a fourth exemplary embodiment.

FIG. 8 shows an upper part of a sectional view of a further actuator assembly 92, which is a modification of the assembly 64 shown in FIGS. 4 and 5. Here, the ring gear 56 is separated from the second lugs 36, which are indicated by an arrow onto a first clutch disc 46 of a clutch 93. The first clutch disc 46 as well as the ring gear 56 comprise circumferential grooves 94 and 96 at the same axial position, which enclose a first set of rollers 98 for rotatably supporting the first clutch disc 46 on the ring gear 56. The first toothing 52 is provided for receiving rollers 100, which are rotatably supported on a second clutch disc 48. Exemplarily, this is conducted by a needle bearing 102 held by a bolt 104 pressed or screwed into the second clutch disc 48. The second clutch disc 48 is axially and concentrically supported by a second set of rollers 106 running in axial grooves 108 and 110 provided in the second clutch disc 48 and the ring gear 56. A spring 73 is placed between a flange 112 of the ring gear 56 and the second clutch disc 48 and provides a reversing force to clutch actuators 62. As shown in FIG. 5, a hose 74 is coupled with the clutch actuators 62 to supply hydraulics fluid. In this exemplary embodiment, very short reaction times for engaging or disengaging the clutch 93 can be realized.

Figure 9:
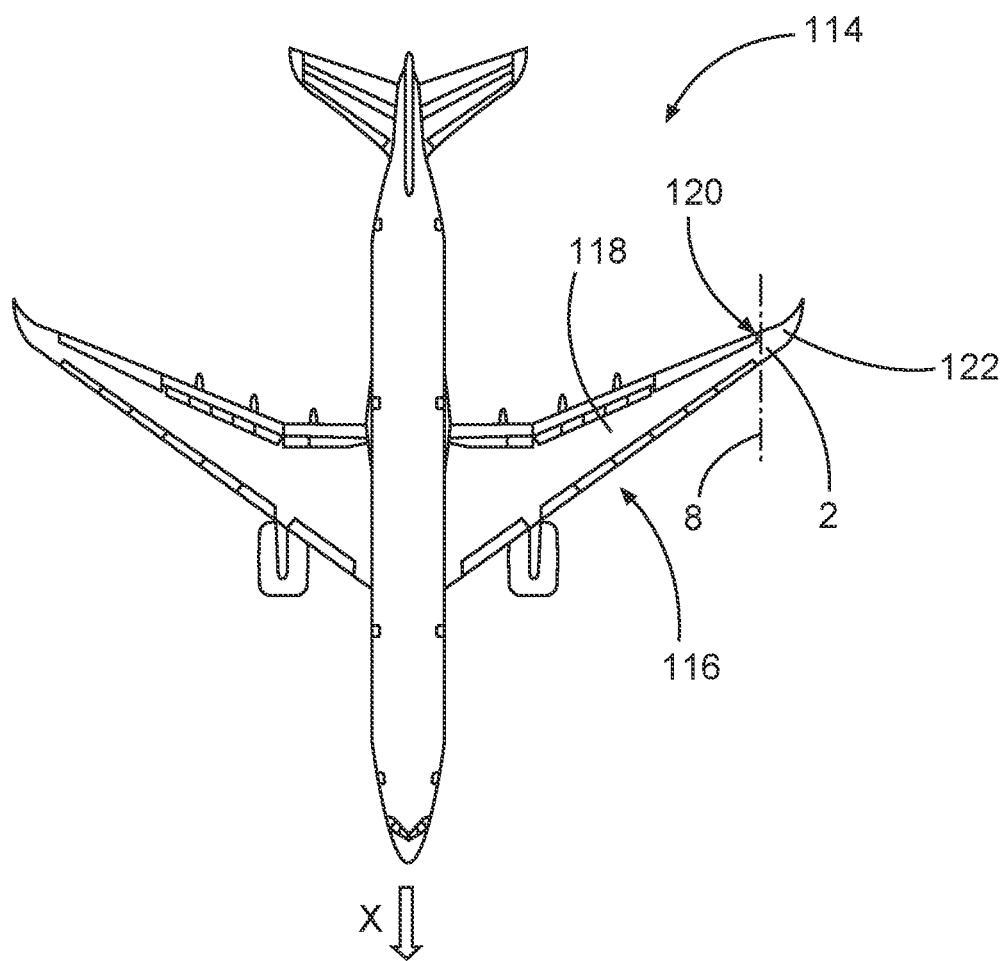
FIG. 9 shows an aircraft having a wing structure, into which an actuator assembly is integrated.

Lastly, FIG. 9 shows an aircraft 114 having a wing structure 116 comprising a fixed wing portion 118, a hinge 120 and a movable wing tip portion 122. For moving the wing tip portion 122, and actuator assembly 2 is provided, wherein the central axis 8 of the actuator assembly 2 is parallel to a longitudinal axis x of the aircraft 114 as an example. However, it may also enclose an angle of up to 10 or 20° with the longitudinal axis. The other actuator assemblies 64, 76 and 92 are also applicable to be integrated into the aircraft 114.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. An actuator assembly for moving a movable aerodynamic surface of an aircraft, comprising:
    an input section for introducing an externally provided rotary motion into the actuator assembly, and
    a geared rotary actuator having a plurality of actuator slices each comprising a planetary gear with a sun gear couplable to the input section, a fixed gear attachable to a fixed component of the aircraft and an output gear couplable with the movable aerodynamic surface,
    at least a first and a second clutch operatively connected to the geared rotary actuator, wherein the geared rotary actuator is configured to couple with the movable surface, and to selectively decouple from the input section to allow for the free movement of the movable surface,
    wherein the at least first clutch is disposed at a first end of the actuator assembly and the second clutch is disposed at a second end of the actuator assembly,
    wherein a plurality of the actuator slices is operatively bounded between the first and the second clutches along a central axis, and
    wherein each actuator slice comprises an output gear coupled with a lug couplable with the fixed component.

2. The actuator assembly of claim 1, wherein the input section comprises an input shaft, which comprises or is coupled with the sun gear.

3. The actuator assembly of claim 2, wherein the input shaft completely extends through each of the plurality of actuator slices, wherein a first end of the input shaft is couplable with a drive unit and wherein a second end of the input shaft is couplable with a brake.

4. The actuator assembly of claim 1, wherein the first and the second clutches are arranged at each output gear of each of the respective plurality of actuator slices to selectively decouple the respective output gear from the movable surface.

5. The actuator assembly of claim 1, wherein at least a part of the output gear of each of the plurality of actuator slices is movable along a central axis of the geared rotary actuator in a first direction to decouple the respective output gear from the remaining part of the respective planetary gear, and in a second direction to couple the respective output gear to the remaining part of the respective planetary gear.

6. The actuator assembly of claim 5, further comprising a spring unit configured to urge the respective output gear to the second direction.

7. The actuator assembly of claim 1, wherein the at least first and the second clutches comprises a first element and a second element,
wherein the first element comprises a first toothing,
wherein the second element comprises a second toothing, and
wherein the first toothing and the second toothing are configured to engage each other upon flush contact of the elements to transfer a torque.

8. The actuator assembly of claim 1, wherein at least one clutch actuator is provided to selectively open or close the at least first and the second clutches.

9. The actuator assembly of claim 1, wherein the at least first and the second clutches each comprises a bearing having rolling elements to reduce a required clutch actuation force.

10. The actuator assembly of claim 7, wherein one of the first toothing and the second toothing comprises rollers rotatably supported in one of the first clutch disc and the second clutch disc,
wherein the other one of the first toothing and the second toothing is configured to receive the rollers.

11. The actuator assembly of claim 1, wherein in that the actuator assembly further comprises at least one lug, wherein a first lug is couplable with the fixed component and wherein a second lug is couplable with the movable surface,
wherein at least the first clutch is configured to selectively decouple the output gear from the second lug.

12. A wing structure, comprising:
a fixed wing portion,
a hinge,
a movable wing tip portion coupled to the fixed wing portion through the hinge, and
at least one actuator assembly of claim 1,
wherein the at least one actuator assembly is coupled with the fixed wing portion and the wing tip portion to selectively move the wing tip portion about the hinge,
wherein the actuator assembly comprises a clutch to selectively decouple the wing tip portion from the actuator assembly, such that it freely rotates about the hinge.

13. The wing structure of claim 12, wherein the at least one actuator assembly comprises:
an input section for introducing an externally provided rotary motion into the actuator assembly, and
a geared rotary actuator having at least one actuator slice comprising a planetary gear with a sun gear couplable to the input section, a fixed gear attachable to a fixed component of the aircraft and an output gear couplable with the movable aerodynamic surface,
wherein the at least first and second clutches are connected to the geared rotary actuator and is configured to couple the movable surface with the input section and to selectively decouple the movable surface from the input section, such that it is freely movable.

14. An aircraft, comprising the wing structure of claim 12.

15. An aircraft, comprising a movable aerodynamic surface and the actuator assembly according to claim 1.

* * * * *